US012368226B2

(12) United States Patent
Jiang et al.

(10) Patent No.: US 12,368,226 B2
(45) Date of Patent: Jul. 22, 2025

(54) ANTENNA INSTALLATION DEVICE AND ANTENNA

(71) Applicant: ZTE CORPORATION, Guangdong (CN)

(72) Inventors: Yu Jiang, Guangdong (CN); Gongzhe Zhang, Guangdong (CN); Pei Liu, Guangdong (CN); Ruochen Liao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 108 days.

(21) Appl. No.: 18/562,870

(22) PCT Filed: May 10, 2022

(86) PCT No.: PCT/CN2022/091858
§ 371 (c)(1),
(2) Date: Nov. 21, 2023

(87) PCT Pub. No.: WO2022/257680
PCT Pub. Date: Dec. 15, 2022

(65) Prior Publication Data
US 2024/0222843 A1 Jul. 4, 2024

(30) Foreign Application Priority Data
Jun. 8, 2021 (CN) ......................... 202110639536.8

(51) Int. Cl.
*H01Q 1/12* (2006.01)
*H01Q 1/24* (2006.01)
*H01Q 21/28* (2006.01)

(52) U.S. Cl.
CPC ......... *H01Q 1/1235* (2013.01); *H01Q 1/1228* (2013.01); *H01Q 1/1242* (2013.01); *H01Q 1/246* (2013.01); *H01Q 21/28* (2013.01)

(58) Field of Classification Search
CPC ...... H01Q 1/12; H01Q 1/1207; H01Q 1/1228; H01Q 1/1235; H01Q 1/1242; H01Q 1/125; H01Q 1/1264; H01Q 1/246; H01Q 21/28; F16B 3/06; F16B 7/02; F16B 7/025
See application file for complete search history.

(56) References Cited

FOREIGN PATENT DOCUMENTS

CN 110571506 A * 12/2019

* cited by examiner

*Primary Examiner* — Robert Karacsony
(74) *Attorney, Agent, or Firm* — Li & Cai Intellectual Property (USA) Office

(57) ABSTRACT

An antenna installation device, including a holding pole component fixedly connected with a holding pole, a first support and a second support that are fixedly connected with the holding pole component, and a centering component for centering the first support and the second support, the centering component includes a centering rotation shaft rotatably connected with the first support, a centering regulating rod having a fixed end which is connected with the centering rotation shaft and rotates in a vertical plane with respect to the centering rotation shaft, and a conical gasket sleeved and moving on the centering regulating rod, the second support has a centering slot, at least part inner surface of the centering slot is a conical surface to be fitted together with a conical surface of the conical gasket to center and fixedly connect the first support with the second support. An antenna is further provided.

13 Claims, 7 Drawing Sheets

ANTENNA INSTALLATION DEVICE AND ANTENNA

CROSS-REFERENCE TO RELATED APPLICATIONS

The present application is a National Phase Application filed under 35 U.S.C. 371 as a national stage of PCT/CN2022/091858 filed on May 10, 2022, and claims the priority of Chinese Patent Application No. 202110639536.8, filed on Jun. 8, 2021, the contents of which are incorporated herein in their entirety by reference.

TECHNICAL FIELD

The present application relates to the field of communication technologies, in particular, to an antenna installation device and an antenna.

BACKGROUND

In a process of laying the equipment of 5th-Generation Mobile Communication Technology (5G), in order to conserve site resources, the pieces of equipment on a signal tower is continuously increased, so that a space in the sky is increasingly starved or inadequate. Therefore, at present, an antenna of 4th-Generation Mobile Communication Technology (4G) and an antenna of 5G are generally integrated on a same signal tower through an antenna installation device (i.e., a device for installing/fixing antennas thereto), so as to save a space for installing the antenna of 4G and the antenna of 5G therein, improve a coverage rate, simultaneously reduce a construction cost of communication networks, and reduce the number of times for installing antennas onto tower for workers.

At present, the antenna installation device includes a first support, a second support and a middle support, each of the first support and the second support is fixedly connected with a communication device, and the middle support is connected with the first support and the second support and is also connected with a holding pole. Due to a complex structure of the antenna installation device, it is difficult to positioning the first support, the second support and the middle support during assembling them together, resulting in complex operations, which is inconvenient for an installation.

SUMMARY

In a first aspect, the present application provides an antenna installation device, including a first support connected with a first antenna apparatus, a second support connected with a second antenna apparatus, and a holding pole component fixedly connected with a holding pole, the first support and the second support are fixedly connected with the holding pole component, the antenna installation device further includes a centering component for centering the first support and the second support, the centering component includes a centering rotation shaft, a centering regulating rod, a conical gasket, the centering rotation shaft is rotatably connected with the first support, a fixed end of the centering regulating rod is connected with the centering rotation shaft, and rotates in a vertical plane with respect to the centering rotation shaft serving as a rotation axis, the conical gasket is sleeved on the centering regulating rod and moves on the centering regulating rod, the second support is provided with a centering slot penetrating through the second support, at least a part of an inner surface of the centering slot is a conical surface, and in response to that the conical surface of the centering slot and a conical surface of the conical gasket are fitted together, the first support and the second support are centered and fixedly connected.

In a second aspect, the present application provides an antenna, including a first antenna apparatus, a second antenna apparatus, and the antenna installation device provided in the present application, the first antenna apparatus is fixedly connected with the first support of the antenna installation device, the second antenna apparatus is fixedly connected with the second support of the antenna installation device.

DETAIL DESCRIPTION OF EMBODIMENTS

In order to make those skilled in the art better understand the technical solutions of the present application, an antenna installation device and an antenna provided in the present application are described in detail below with reference to the accompanying drawings.

Exemplary implementations are described in detail below with reference to the accompanying drawings, but may be embodied in different forms, and should not be construed as limited to the embodiments set forth herein. The implementations are illustrated to make the present application more thorough and complete, and for those skilled in the art more fully understanding the scope of the present application.

As used herein, a term "and/or" includes any and all combinations of at least one of listed items.

The terms used in the present application are for a purpose of describing particular embodiments only, and are not intended to limit the present application. As used in the present application, singular forms "a" and "the" are intended to include plural forms as well, i.e., to represent at least one, unless the context clearly defines otherwise. It should further be understood that terms "includes/comprises" and/or "made of/consisted of" in the present application are used to specify a presence of at least one of recited features, integers, steps, operations, elements or components, but do not preclude a presence or an addition of at least one of other features, integers, steps, operations, elements, components or groups thereof.

Implementations of the present application may be described with reference to plan and/or cross-sectional views with the help of idealized schematic illustrations of the present application. Therefore, the example illustrations may be modified in accordance with manufacturing techniques and/or tolerances. Implementations of the present application are not limited to those shown in the accompanying drawings, but include modifications of any configuration formed based on a manufacturing process. Therefore, areas illustrated in the accompanying drawings have schematic properties, and shapes of the areas illustrated in the accompanying drawings illustrate specific shapes of the areas of elements, but are not limiting.

Unless otherwise defined, meanings of all terms (including technical terms and scientific terms) used herein are the same as meanings commonly understood by one of ordinary skill in the art. It should further be understood that terms, such as those defined in common dictionaries, should be construed as having a meaning that is consistent with that in background of the existing art and the present application, and should not be construed as having an idealized or over-formal meaning, unless expressly defined in the present application.

Figure 1:
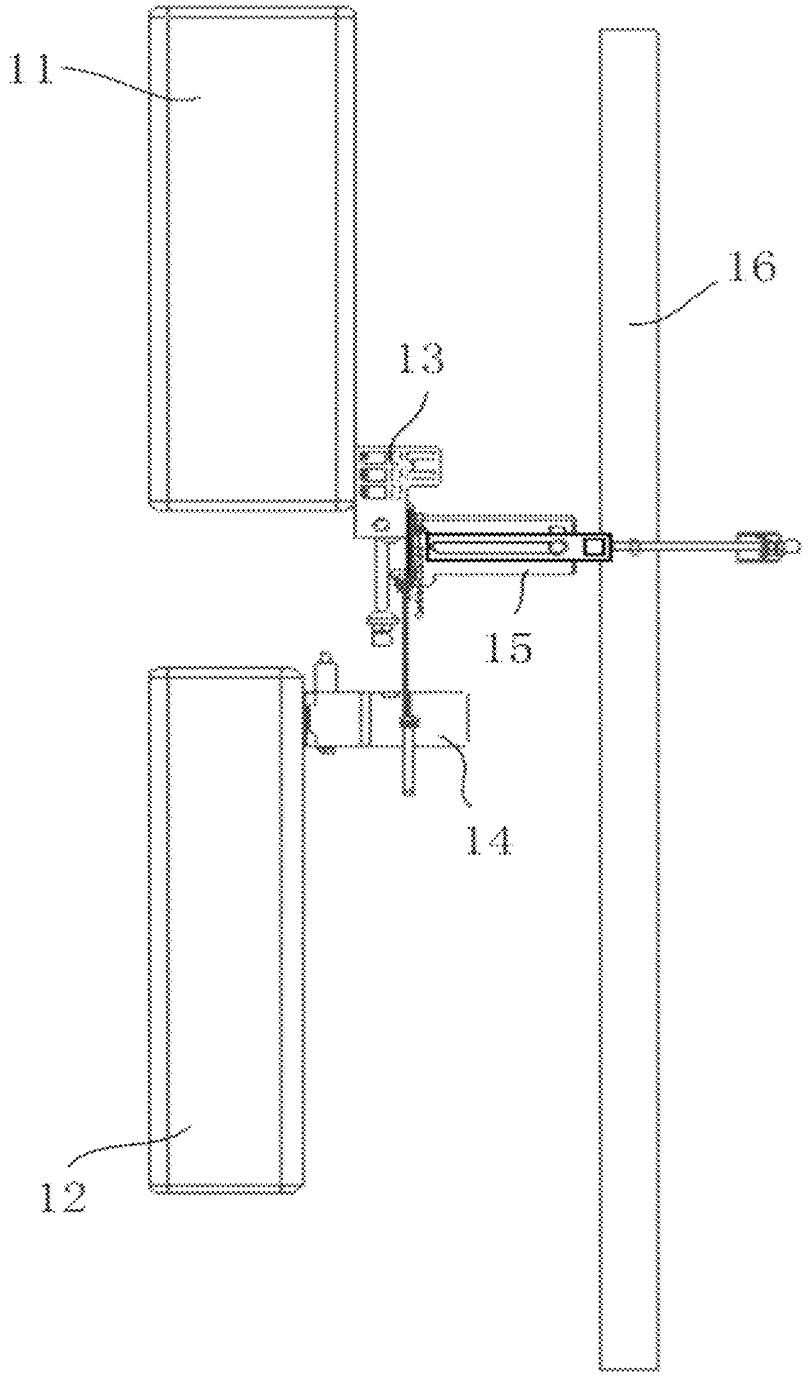
FIG. 1 is a diagram of a scene in which an antenna installation device is applied according to the present application.

FIG. 1 is a diagram of a scene in which an antenna installation device is applied according to the present application. As shown in FIG. 1, two antenna apparatuses, i.e., a first antenna apparatus 11 and a second antenna apparatus 12, are provided in the scene, the first antenna apparatus 11 may be an antenna apparatus for a 4G network, and the second antenna apparatus 12 may be an antenna apparatus for a 5G network; or, the first antenna apparatus 11 may be an antenna apparatus for the 5G network, the second antenna apparatus 12 may be an antenna apparatus for the 4G network.

The first antenna apparatus 11 and the second antenna apparatus 12 are fixed to a holding pole 16 through the antenna installation device. The antenna installation device includes a first support 13, a second support 14 and a holding pole component 15; the first antenna apparatus 11 is fixed to the first support 13, the second antenna apparatus 12 is fixed to the second support 14, the first support 13 and the second support 14 are fixedly connected with the holding pole component 15, the holding pole component 15 is fixed to the holding pole 16. In other words, the first antenna apparatus 11 is fixed to the holding pole 16 through the first support 13 and the holding pole component 15, the second antenna apparatus 12 is fixed to the holding pole 16 through the second support 14.

In some implementations, the first support 13 and the second support 14 are arranged up and down along an axial direction of the holding pole 16, in which an axis of the holding pole 16 extends. It should be noted that positions of the first support 13 and the second support 14 may be interchanged, i.e., the first support 13 may be arranged above the second support 14, or the second support 14 may be arranged above the first support 13.

For convenience of description, a case where the first support 13 is arranged above the second support 14, and configured for fixing the first antenna apparatus 11, and the second support 14 is configured for fixing the second antenna apparatus 12 is illustrated as an example in the present application.

The antenna installation device provided in the present application further includes a centering component, which is not only beneficial to centering the first support 13 and the second support 14, but also is beneficial to simplifying operations for installing the antenna apparatuses, reducing the difficulty of installing the first antenna apparatus 11 and the second antenna apparatus 12, and simultaneously improving the efficiency of installing the antenna apparatuses.

Figure 2:
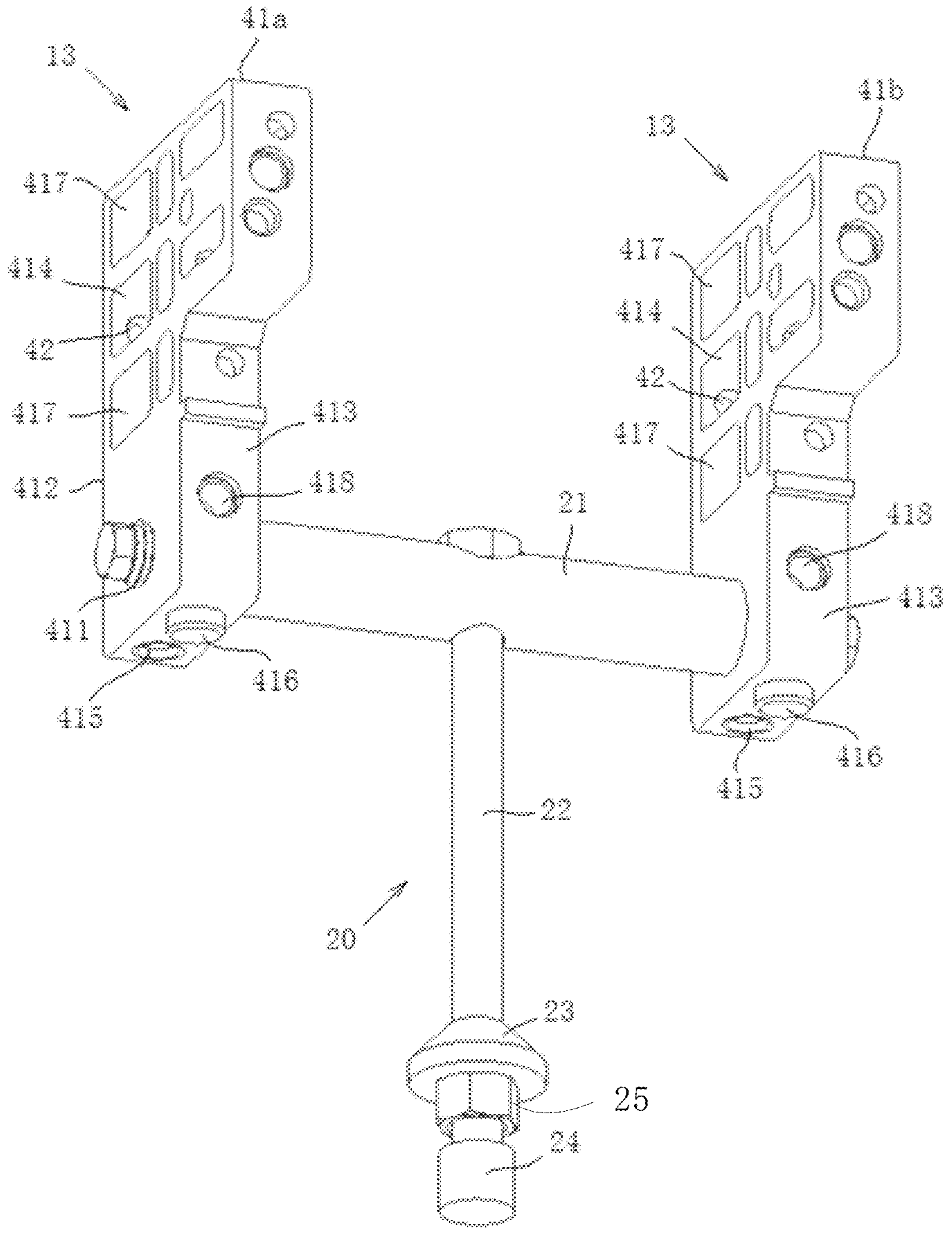
FIG. 2 is a schematic structural diagram of a centering component and a first support according to the present application.

FIG. 2 is a schematic structural diagram of a centering component and a first support according to the present application. As shown in FIG. 2, the centering component 20 includes a centering rotation shaft 21, a centering regulating rod 22, a conical gasket 23; the centering rotation shaft 21 is rotatably connected with the first support 13. For example, the centering rotation shaft 21 is rotatably connected with the first support 13 through a bearing, i.e., the bearing is fixed to the first support 13, and the centering rotation shaft 21 is sleeved on the bearing.

A fixed end of the centering regulating rod 22 is connected with the centering rotation shaft 21, and rotates in a vertical plane with respect to the centering rotation shaft 21 serving as a rotation axis, a free end of the centering regulating rod 22 sags freely, in response to that an acting force is applied to the free end of the centering regulating rod 22, the centering regulating rod 22 can rotate in the vertical plane with respect to the centering rotation shaft 21 serving as the rotation axis. It should be noted that the fixed end and the free end of the centering regulating rod 22 are two opposite ends of the centering regulating rod 22.

In some implementations, the conical gasket 23 is sleeved on the centering regulating rod 22, and moves up and down along an axial direction of the centering regulating rod 22, in which an axis of the centering regulating rod 22 extends, to regulate a position of the conical gasket 23 relative to the centering regulating rod 22. An end of the conical gasket 23 with a smaller outer diameter is close to the centering rotation shaft 21 (e.g., facing upward), an end of the conical gasket 23 with a larger outer diameter is away from the centering rotation shaft 21 (e.g., facing downward), i.e., a larger end of the conical gasket 23 is away from the centering rotation shaft 21 (e.g., facing downward), a smaller end of the conical gasket 23 is close to the centering rotation shaft 21 (e.g., facing upward), the conical gasket 23 is in a pyramid shape. The conical gasket 23 is further configured to connect the first support 13 with the second support 14. Along with the conical gasket 23 moving toward the first support 13, the second support 14 moves close to the first support 13. If the conical gasket 23 cannot further move toward the first support 13, it indicates that the conical gasket 23 has been tightened, i.e., the conical gasket 23 has reached an end point, and the first support 13 and the second support 14 has been fixedly connected, that is, the first support 13 and the second support 14 can be fixedly connected through the centering component 20.

In some implementations, in a case where the first support 13 is arranged below and the second support 14 is arranged above, the free end of the centering regulating rod 22 in the centering component 20 may face upward (be away from the centering rotation shaft 21 and the first support 13), the fixed end of the centering regulating rod 22 may face downward (be close to the centering rotation shaft 21 and the first support 13), the end of the conical gasket 23 with the smaller outer diameter faces downward (is close to the centering rotation shaft 21 and the first support 13), the end of the conical gasket 23 with the larger outer diameter faces upward (is away from the centering rotation shaft 21 and the first support 13), i.e., the smaller end of the conical gasket 23 faces downward (is close to the centering rotation shaft

21 and the first support 13), the larger end of the conical gasket 23 faces upward (is away from the centering rotation shaft 21 and the first support 13), the conical gasket 23 is in an inverted pyramid shape.

In some implementations, the centering component 20 further includes an anti-disengaging part 24 provided at the free end (away from the centering rotation shaft 21) of the centering regulating rod 22 to prevent the conical gasket 23 from disengaging from the centering regulating rod 22.

In some implementations, the centering component 20 further includes a lock nut 25 screwed with the centering regulating rod 22, and the lock nut 25 can be rotated to move the conical gasket 23 up and down along the axial direction of the centering regulating rod 22.

Figure 3:
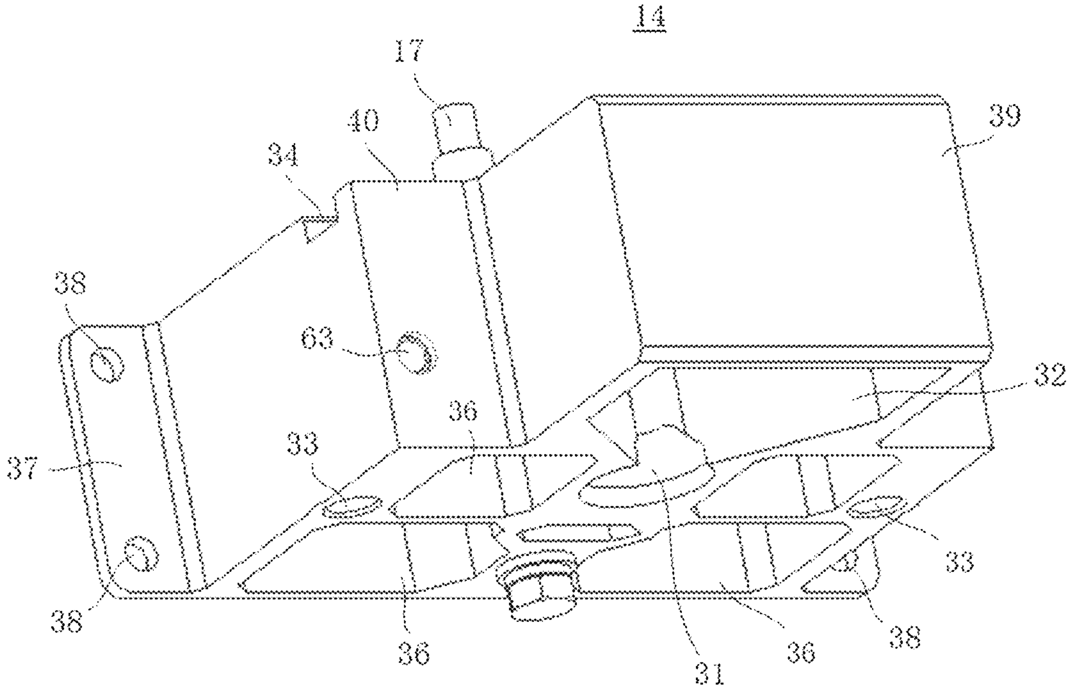
FIG. 3 is a schematic structural diagram of a second support according to the present application.

FIG. 3 is a schematic structural diagram of a second support according to the present application. As shown in FIG. 3, the second support 14 is provided with a centering slot 31 penetrating through the second support 14, at least a part of an inner surface of the centering slot 31 is a conical surface, and in a case where the conical surface of the centering slot 31 and a conical surface of the conical gasket 23 are fitted together, the first support 13 and the second support 14 are centered in a left-right direction. After the first support 13 and the second support 14 are centered in the left-right direction, the first support 13 and the second support 14 can be adjusted only in an up-down direction and a front-rear direction. It should be noted that the left-right direction herein refers to a left-right direction of the antenna apparatus (the first antenna apparatus 11 and the second antenna apparatus 12) during a viewer standing on a front side of the antenna apparatus (e.g., a left side of FIG. 1), and looking toward the antenna apparatus (e.g., a right side of FIG. 1), the up-down direction herein refers to an up-down direction of the antenna apparatus (the first antenna apparatus 11 and the second antenna apparatus 12), the front-rear direction herein refers to a direction in which the viewer becomes closer or farther from the antenna apparatus (the first antenna apparatus 11 and the second antenna apparatus 12).

In some implementations, the second support 14 is further provided with a guide hole 32 penetrating through the second support 14, the guide hole 32 and the centering slot 31 penetrate through the second support 14 in a radial direction of the second support 14, and an inner diameter of the guide hole 32 is larger than an inner diameter of the centering slot 31. During the centering regulating rod 22 rotating in the vertical plane with respect to the centering rotation shaft 21 serving as the rotation axis, the centering regulating rod 22 can move between the centering slot 31 and the guide hole 32, i.e., the centering regulating rod 22 may move from the centering slot 31 to the guide hole 32, or may move from the guide hole 32 to the centering slot 31, so as to facilitate the centering component 20 to capture the second support 14.

In order to increase a dimension of the guide hole 32 and facilitate the centering regulating rod 22 to capture the second support 14, the second support 14 is provided with a lug boss 39, and the guide hole 32 is disposed at a position of the lug boss 39.

In some implementations, at least a part of an inner surface of the centering slot 31 is a conical surface, an end of the conical surface with a larger inner diameter faces downward, and an end of the conical surface with a smaller inner diameter faces upward, i.e., the conical surface is in an inverted funnel shape. During the second support 14 moving toward a direction in which the second support 14 is closer to the first support 13, the centering regulating rod 22 is rotated to thread through the guide hole 32 from top to bottom, and if the centering regulating rod 22 is rotated again, the centering regulating rod 22 is to be threaded into the centering slot 31, then the conical gasket 23 is rotated to move upward along the axial direction of the centering regulating rod 22, or the second support 14 is moved downward, so that an outer surface of the conical gasket 23 and the conical surface of the centering slot 31 are fitted together, which can prevent the second support 14 from moving toward a direction away from the first support 13, and the first antenna apparatus 11 fixed on the first support 13 and the second antenna apparatus 12 fixed on the second support 14 can be centered in the left-right direction.

It should be noted that, before the first support 13 is connected to the second support 14, the holding pole component 15 is fixed to the holding pole 16, and the first support 13 is fixedly connected to the holding pole component 15.

Figure 4:
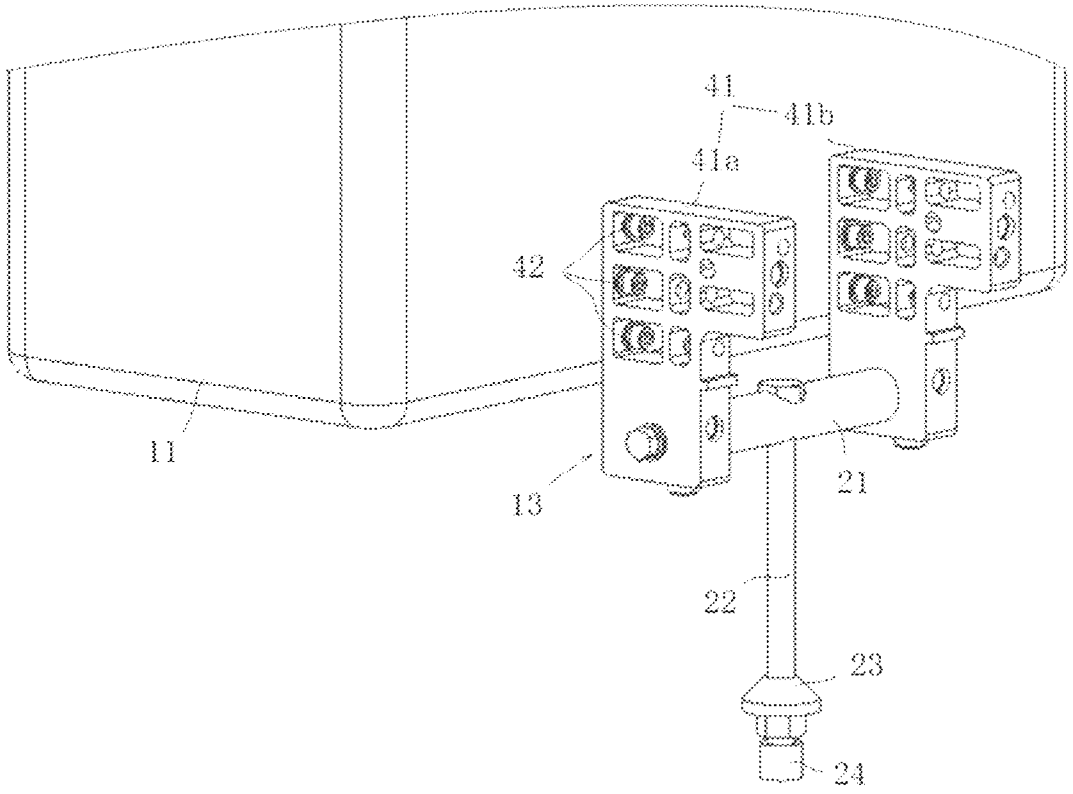
FIG. 4 is a schematic structural diagram of a first antenna apparatus, a first support, and a centering component according to the present application.

FIG. 4 is a schematic structural diagram of a first antenna apparatus, a first support, and a centering component according to the present application. As shown in FIG. 2 and FIG. 4, the first support 13 includes an adapter 41 for fixing the first antenna apparatus 11, the centering rotation shaft 21 is rotatably disposed on the adapter 41, a first fixing surface 412 of the adapter 41 is fixedly connected with the first antenna apparatus 11, a second fixing surface 413 of the adapter 41 is fixedly connected with the holding pole component 15. It should be noted that, the first fixing surface 412 and the second fixing surface 413 of the adapter 41 are a pair of opposite fixing surfaces (i.e., two opposite fixing surfaces), and the first antenna apparatus 11 and the holding pole component 15 are respectively disposed on the two opposite fixing surfaces of the adapter 41.

In some implementations, the adapter 41 includes a first adapter 41*a* and a second adapter 41*b*, which are arranged in parallel, and two ends of the centering rotation shaft 21 are rotatably connected to the first adapter 41*a* and the second adapter 41*b*, respectively; first fixing surfaces 412 of the first adapter 41*a* and the second adapter 41*b* are fixedly connected with the first antenna apparatus 11, and second fixing surfaces 413 of the first adapter 41*a* and the second adapter 41*b* are fixedly connected with the holding pole component 15.

In some implementations, the first adapter 41*a* and the second adapter 41*b* are rotatably connected with the centering rotation shaft 21 through bearings. Specifically, a shaft hole 411 is provided in a surface of the first adapter 41*a* opposite to the second adapter 41*b*, a bearing is provided in the shaft hole 411, and an end of the centering rotation shaft 21 is fixed to the bearing, so that the centering rotation shaft 21 is rotatably connected with the first adapter 41*a*. A shaft hole 411 is provided in a surface of the second adapter 41*b* opposite to the first adapter 41*a*, a bearing is provided in the shaft hole 411, and another end of the centering rotation shaft 21 is fixed to the bearing, so that the centering rotation shaft 21 is rotatably connected with the second adapter 41*b*.

It should be noted that the centering rotation shaft 21 may also be rotatably connected with the first adapter 41*a* and the second adapter 41*b* in other manners, which is not limited in the present application.

In some implementations, the adapter 41 is fixedly connected with the first antenna apparatus 11 through a bolt 42. Specifically, the first adapter 41*a* is provided with an operation hole 414 at a position thereof close to the first fixing surface 412, and a through hole is provided in the first adapter 41*a* between the operation hole 414 and the first fixing surface 412, the bolt 42 penetrates the through hole to be fixed to a housing of the first antenna apparatus 11, thereby fixedly connecting the first adapter 41*a* with the first antenna apparatus 11. The second adapter 41*b* is provided with an operation hole 414 at a position thereof close to the first fixing surface 412, and a through hole is provided in the second adapter 41*b* between the operation hole 414 and the first fixing surface 412, the bolt 42 penetrates the through hole to be fixed to a housing of the first antenna apparatus 11, thereby fixedly connecting the second adapter 41*b* with the first antenna apparatus 11.

It should be noted that the number of operation holes 414 may be determined according to the number of bolts 42 for connecting the first adapter 41*a* with the first antenna apparatus 11, and generally, the number of operation holes 414 is greater than or equal to the number of bolts 42.

In some implementations, the adapter 41 is fixedly connected to the holding pole component 15 through a bolt. Specifically, the second fixing surface 413 of the first adapter 41*a* may be provided therein with a screw hole, the holding pole component 15 is provided therein with a through hole at a position corresponding to that of the screw hole, a bolt penetrates the through hole of the holding pole component 15 to be screwed with the screw hole in the second fixing surface 413 of the first adapter 41*a* so that the holding pole component 15 and the first adapter 41*a* are fixedly connected. The second fixing surface 413 of the second adapter 41*b* may be provided therein with a screw hole, the holding pole component 15 is provided therein with a through hole at a position corresponding to that of the screw hole, and a bolt penetrates the through hole of the holding pole component 15 to be screwed with the screw hole in the second fixing surface 413 of the second adapter 41*b*, so that the holding pole component 15 and the second adapter 41*b* are fixedly connected.

In some implementations, the first support 13 and the second support 14 are fixedly connected through a support lock part. As shown in FIG. 2 and FIG. 3, a fixing hole 415 is provided in a surface of the first support 13 close to the second support 14, and the surface of the first support 13 close to the second support 14 refers to a surface of the first support 13 close to the second support 14 after the first support 13 and the second support 14 are fixedly connected. The second support 14 is provided therein with a first connection hole 33 penetrating through the second support 14, the support lock part may be threaded into the first connection hole 33 of the second support 14 and the fixing hole 415 of the first support 13, so as to fixedly connect the first support 13 with the second support 14. In a case where the centering component 20 malfunctions, the support lock part can maintain a state in which the first support 13 and the second support 14 are connected, thereby improving the reliability of the connection between the first support 13 and the second support 14.

In order to accurately position the first support 13 and the second support 14, a positioning column 416 and a positioning slot 34 may be provided on surfaces of the first support 13 and the second support 14 that are close to each other, respectively. Specifically, as shown in FIG. 2 and FIG. 3, the positioning column 416 is provided on a surface of the first support 13 close to the second support 14, the positioning slot 34 is provided in a surface of the second support 14 close to the first support 13, during a process of connecting the first support 13 with the second support 14, the first support 13 and the second support 14 can be accurately positioned by means of the positioning column 416 and the positioning slot 34.

In some implementations, the positioning slot 34 is disposed in the surface of the first support 13 close to the second support 14, and the positioning column 416 is disposed on the surface of the second support 14 close to the first support 13, i.e., even positions of the positioning column 416 and the positioning slot 34 in the above implementations are interchanged, the purpose of accurately positioning the first support 13 and the second support 14 can also be achieved.

In some implementations, the first support 13 and the second support 14 are fixedly connected to the holding pole component 15. In a case where the holding pole component 15 is damaged so that a fixed connection between the second support 14 and the holding pole component 15 is broken, the second support 14 and the second antenna apparatus 12 connected to the second support 14 may fall from the holding pole 16, resulting in an irreparable loss. For increasing the security of the second support 14 and the second antenna apparatus 12 connected to the second support 14, in the present application, the second support 14 may be fixedly connected with the first antenna apparatus 11.

Figure 5:
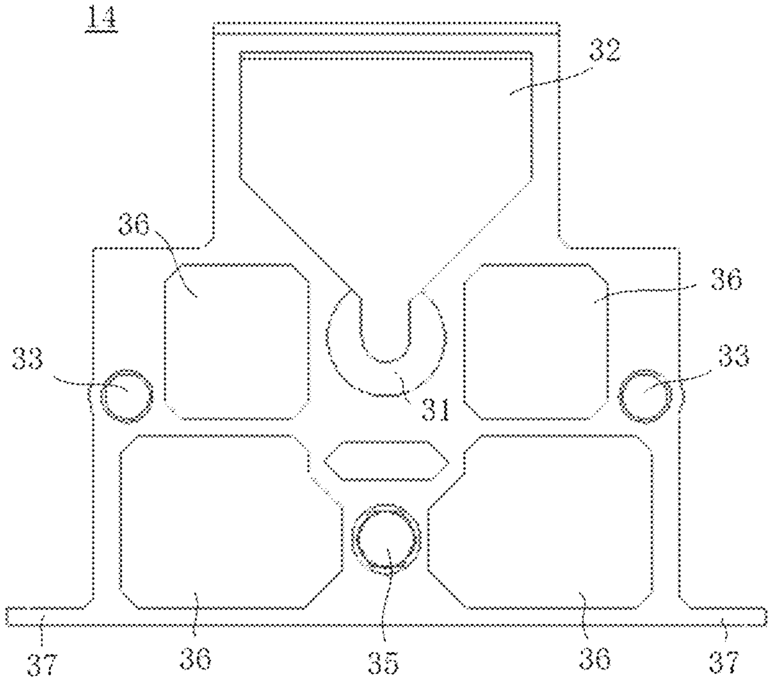
FIG. 5 is a schematic structural diagram of a second support according to the present application.

FIG. 5 is a schematic structural diagram of a second support according to the present application. As shown in FIG. 3 and FIG. 5, the second support 14 is provided therein with a second connection hole 35 penetrating through the second support 14, a connection part 17 is threaded into the second connection hole 35 and is fixedly connected to the first antenna apparatus 11, so as to fixedly connect the second support 14 with the first antenna apparatus 11. In a case where the connection between the second support 14 and the holding pole component 15 is broken, the second support 14 and the second antenna apparatus 12 connected to the second support 14 can be prevented from falling from the holding pole 16 by means of a fixed connection between the connection part 17 and the first antenna apparatus 11.

As shown in FIG. 2, in order to reduce a weight of the first support 13 and reduce an amount of materials to be used, a plurality of through holes 417 are provided in the first support 13, and the number of the through holes 417, the size and the shape of each through hole 417 are not limited in the present application, as long as a strength of the first support 13 is not reduced, or even the strength of the first support 13 is reduced, but a design expectation on the first support 13 can be satisfied.

As shown in FIG. 3 and FIG. 5, in order to reduce a weight of the second support 14 and an amount of materials to be used, a plurality of through holes 36 are provided in the second support 14, and the number of the through holes 36, the size and the shape of each through hole 36 are not limited in the present application, as long as a strength of the second support 14 is not reduced, or even the strength of the second support 14 is reduced, but a design expectation on the second support 14 can be satisfied.

As shown in FIG. 3, fixing parts 37 are provided on two sides of the second support 14 at a side of the second support 14 connected to the second antenna apparatus 12, the fixing parts 37 are provided therein with fixing holes 38, and bolts may pass through the fixing holes 38 to be fixedly connected to the second antenna apparatus 12, so as to fixedly connect the second antenna apparatus 12 to the second support 14.

In some implementations, the first support 13 is fixedly connected with the holding pole component 15 through a holding pole lock part. As shown in FIG. 2, a first support connection hole 418 may be provided at a side of the first support 13 opposite to the holding pole component 15, i.e., first support connection holes 418 are provided in the second fixing surfaces 413 of the first adapter 41*a* and the second adapter 41*b*.

Figure 6:
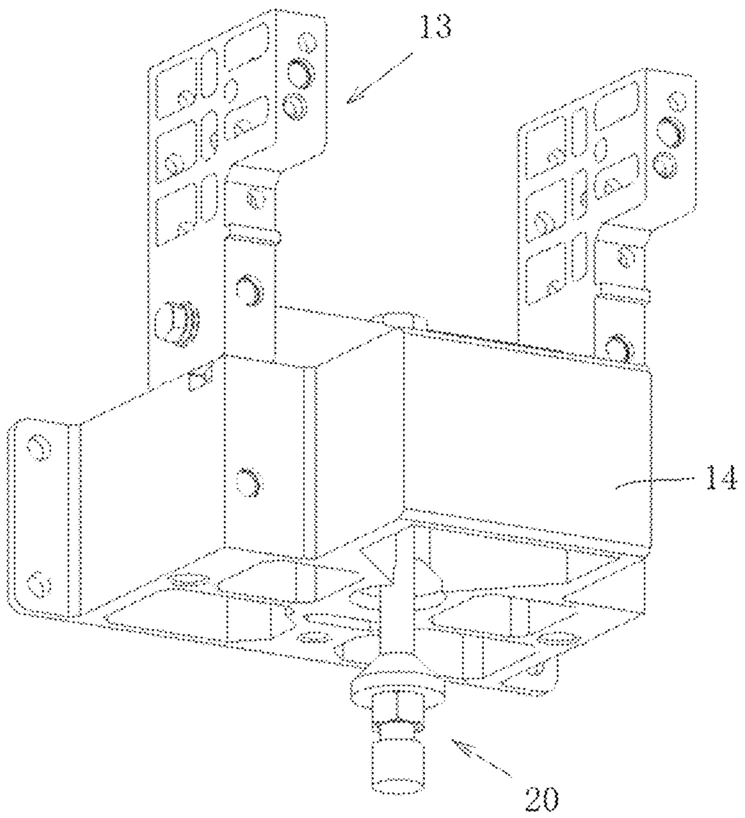
FIG. 6 is a schematic diagram illustrating an assembled state of an antenna installation device according to the present application.

FIG. 6 is a schematic diagram illustrating an assembled state of an antenna installation device according to the present application. As shown in FIG. 6, for connecting the first support 13 with the second support 14, the centering regulating rod 22 is inserted into the centering slot 31, so that the first support 13 and the second support 14 are connected through the centering component 20.

Figure 7:
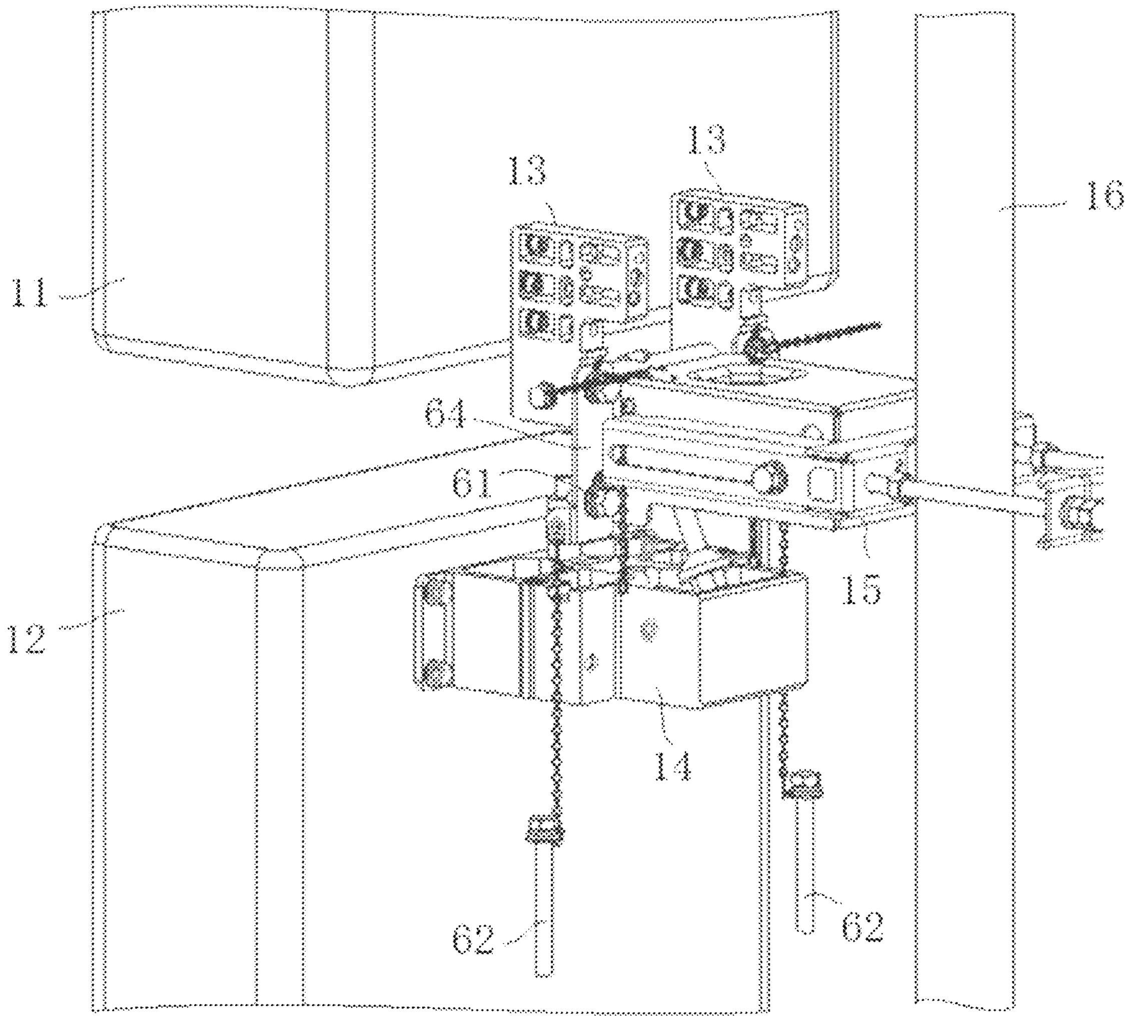
FIG. 7 is a schematic diagram illustrating a process of assembling an antenna apparatus onto an antenna installation device according to the present application.

FIG. 7 is a schematic diagram illustrating a process of assembling an antenna apparatus onto an antenna installation device according to the present application. As shown in FIG. 2, FIG. 3 and FIG. 7, a holding pole connection hole is provided at a side of the holding pole component 15 opposite to the first support 13, a holding pole lock part 61 is threaded into the holding pole connection hole and the first support connection hole 418, so as to fixedly connect the first support 13 with the holding pole component 15. A second support connection hole 63 is provided at a side of the holding pole component 15 opposite to the second support 14, a holding pole connection hole is provided at a side of the holding pole component 15 opposite to the second support 14, the holding pole lock part 61 is threaded into the holding pole connection hole and the second support connection hole 63, so as to fixedly connect the second support 14 with the holding pole component 15.

In some implementations, the second support connection hole 63 is provided in a shoulder 40 of the second support 14, i.e., at least one second support connection hole 63 is arranged in each of shoulders 40 on both sides of the lug boss 39, and the second support 14 is fixedly connected with the holding pole component 15 through the holding pole lock part 61. The second support connection holes 63 being arranged in the shoulders 40 of the second support 14 can make a structure of the second support 14 be more compact.

In some implementations, in order to facilitate the first support 13 and the second support 14 to be connected with the holding pole component 15, a first holding pole limiting part 64 is provided between the first support 13 and the holding pole component 15 for limiting a relative position of the first support 13 with respect to the holding pole component 15. A second holding pole limiting part is provided between the second support 14 and the holding pole component 15 for limiting a relative position of the second support 14 with respect to the holding pole component 15.

In some implementations, the first holding pole limiting part 64 and the second holding pole limiting part may be separated from each other, or may be integrated into one piece, i.e., the first holding pole limiting part 64 and the second holding pole limiting part may be the same one holding pole limiting part. In a process of installing the first antenna apparatus 11 and the second antenna apparatus 12 onto the antenna installation device provided in the present application, the first antenna apparatus 11 is fixedly connected with the first support 13 first, then the first support 13 is fixedly connected with the holding pole component 15, next, the second antenna apparatus 12 is fixedly connected with the second support 14, and subsequently, the second support 14 is fixedly connected with the first support 13, the holding pole component 15, and the first antenna apparatus 11, and specific installation operations are described below.

In some implementations, the antenna installation device includes two centering components, i.e., two centering components are configured to center positions of the first support 13 and the second support 14. Compared with using one centering component, the use of the two centering components can center the first support 13 and the second support 14 in two dimensions (e.g., in a front-rear direction and a left-right direction).

Figure 8:
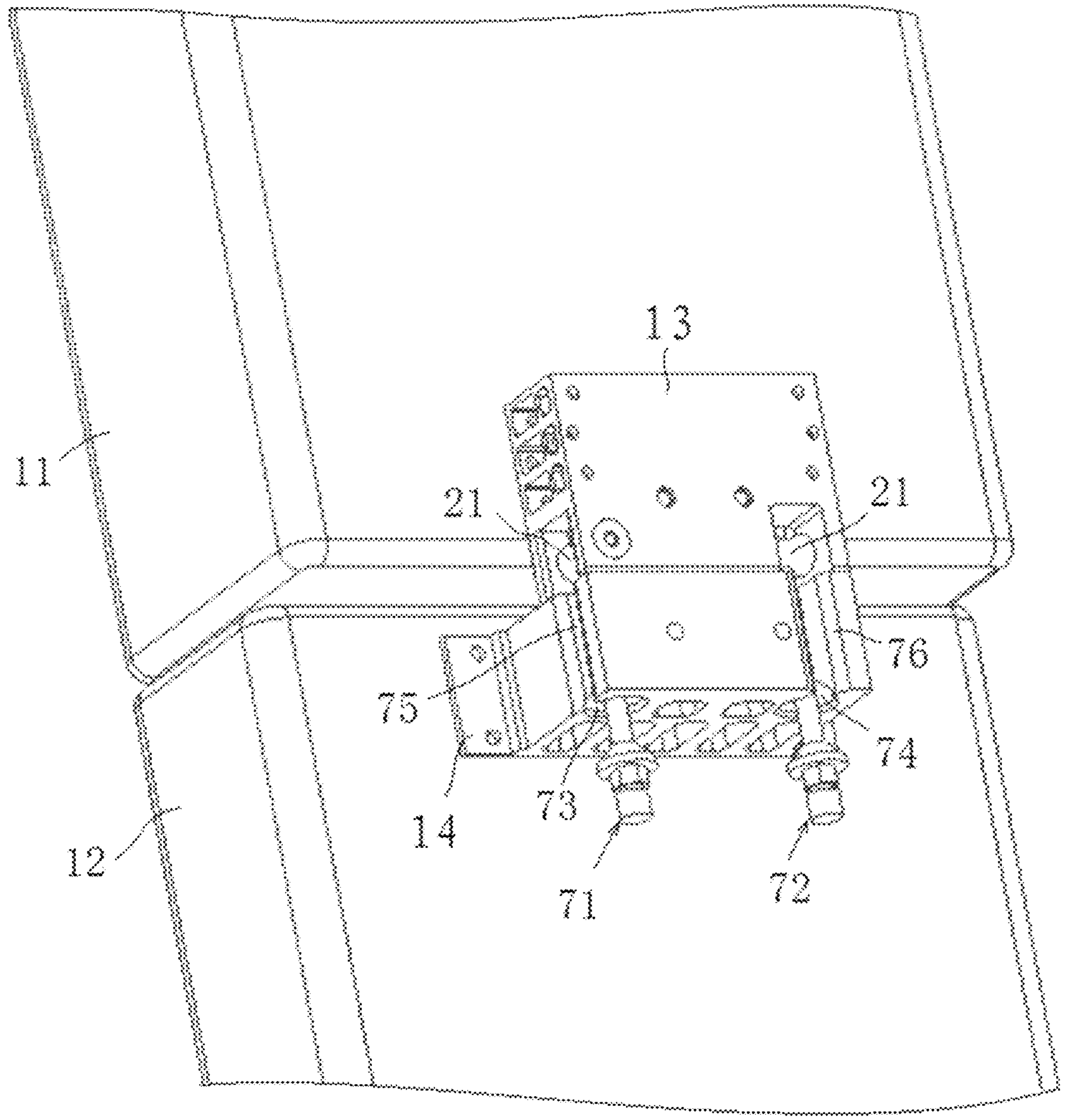
FIG. 8 is a schematic structural diagram of an antenna installation device according to the present application.

FIG. 8 is a schematic structural diagram of an antenna installation device according to the present application. As shown in FIG. 8, the first support 13 is provided thereon with a first centering component 71 and a second centering component 72. Structures of the first centering component 71 and the second centering component 72 are the same as that of the centering component 20 shown in FIG. 2 and thus are not repeated herein.

The first centering component 71 and the second centering component 72 are arranged in parallel along a width direction (parallel to a connection surface between the first support 13 and the first antenna apparatus 11, and perpendicular to an arrangement direction along which the first antenna apparatus 11 and the second antenna apparatus 12 are arranged, such as a horizontal direction) of the first antenna apparatus 11, and orthographic projections of a centering rotation shaft of the first centering component 71 and a centering rotation shaft of the second centering component 72 intersect on a same plane, i.e., the centering rotation shaft of the first centering component 71 and the centering rotation shaft of the second centering component 72 are neither in one straight line nor parallel to each other.

In some implementations, the centering rotation shaft of the first centering component 71 and the centering rotation shaft of the second centering component 72 are perpendicular to each other, and the centering rotation shaft of the first centering component 71 is perpendicular to the first antenna apparatus 11, the centering rotation shaft of the second centering component 72 is parallel to the first antenna apparatus 11.

Correspondingly, the second support 14 is provided therein with two centering slots, i.e., a first centering slot 73 and a second centering slot 74, the first centering slot 73 is configured for disposing the first centering component 71 therein, the second centering slot 74 is configured for disposing the second centering component 72 therein. A side surface of the first centering slot 73 is provided therein with a first opening 75 penetrating through the first centering slot 73 along an axial direction of the first centering slot 73, in which an axis of the first centering slot 73 extends, the centering regulating rod of the first centering component 71 enters the first centering slot 73 through the first opening 75, and a distance between the first support 13 and the second support 14 can be adjusted to make the conical gasket of the first centering component 71 to be fitted together with the first centering slot 73, so as to prevent the second support 14 from being separated from the first support 13. If the conical gasket of the first centering component 71 cannot further move toward the second support 14, it indicates that the first support 13 and the second support 14 have been fixedly connected, i.e., the first support 13 and the second support 14 are fixedly connected through the first centering component 71.

A side surface of the second centering slot 74 is provided therein with a second opening 76 penetrating through the second centering slot 74 along an axial direction of the second centering slot 74, in which an axis of the second centering slot 74 extends, the centering regulating rod of the second centering component 72 enters the second centering slot 74 through the second opening 76, and a distance between the first support 13 and the second support 14 can be adjusted to make the conical gasket of the second centering component 72 to be fitted together with the second centering slot 74, so as to prevent the second support 14 from being separated from the first support 13. If the conical gasket of the second centering component 72 cannot further move toward the second support 14, it indicates that the first support 13 and the second support 14 have been fixedly connected, i.e., the first support 13 and the second support 14 are fixedly connected through the second centering component 72. That is, the first support 13 and the second support 14 are fixedly connected through the first centering component 71 and the second centering component 72.

The first support 13 and the second support 14 can be centered in two dimensions (e.g., in the front-rear direction and the left-right direction) through the first centering component 71 and the second centering component 72, for example, the conical gasket of the first centering component 71 centers the first support 13 and the second support 14 in the front-rear direction, the conical gasket of the second centering component 72 centers the first support 13 and the second support 14 in the left-right direction, and the first support 13 and the second support 14 have only a degree of freedom in the up-down direction, resulting in a more convenient installation process and a faster installation speed.

Figure 9:
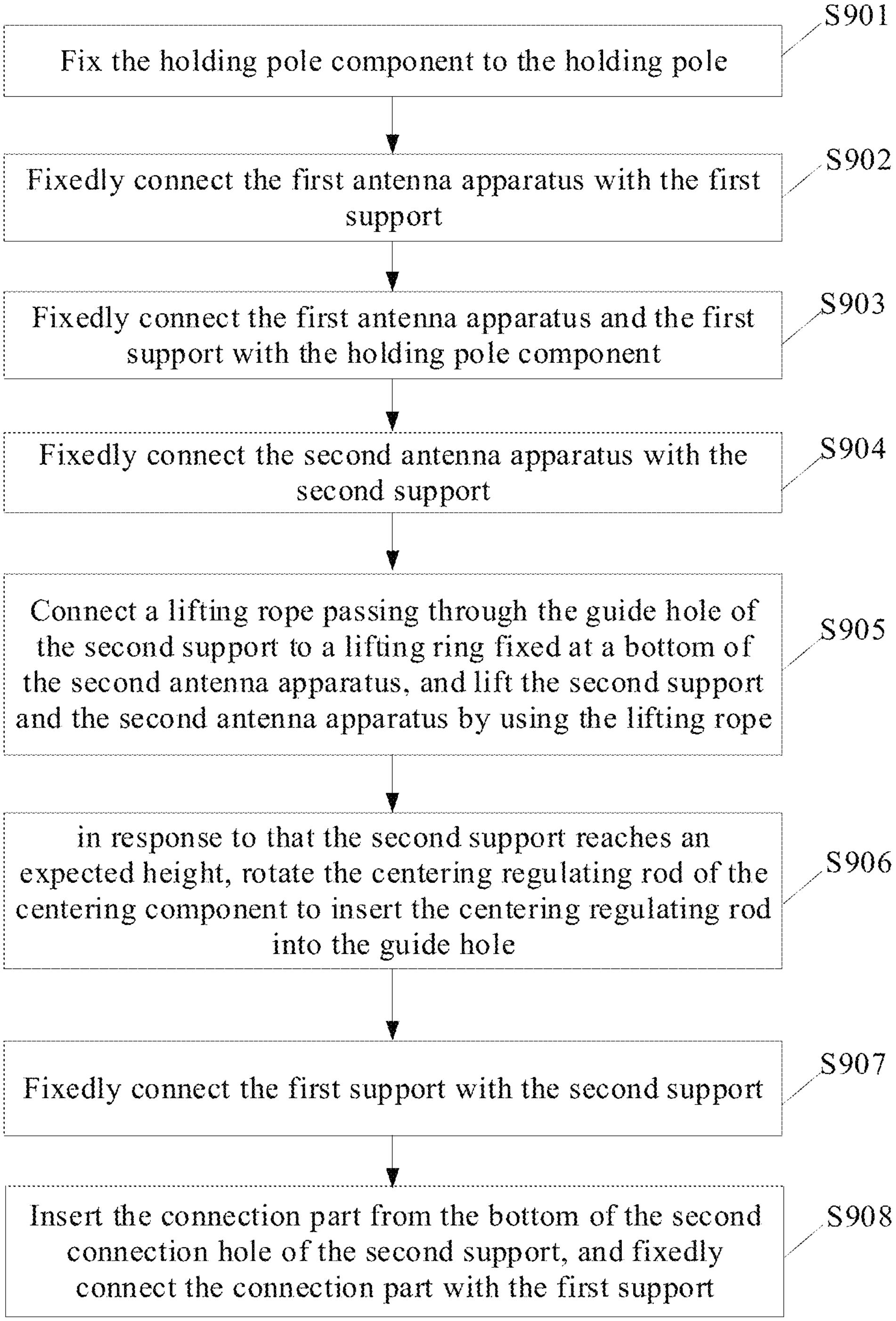
FIG. 9 is a flowchart for installing an antenna apparatus onto an antenna installation device according to the present application.

FIG. 9 is a flowchart for installing an antenna apparatus onto an antenna installation device according to the present application. As shown in FIG. 2, FIG. 3, FIG. 7 and FIG. 9, operations of installing antenna apparatuses onto the antenna installation device provided in the present application may include following operations S901 to S908.

At operation S901, fixing the holding pole component 15 to the holding pole 16.

At operation S902, fixedly connecting the first antenna apparatus 11 with the first support 13.

At operation S903, fixedly connecting the first antenna apparatus 11 and the first support 13 with the holding pole component 15.

At operation S904, fixedly connecting the second antenna apparatus 12 with the second support 14.

At operation S905, connecting a lifting rope passing through the guide hole 32 of the second support 14 to a lifting ring fixed at a bottom of the second antenna apparatus 12, and lifting the second support 14 and the second antenna apparatus 12 by using the lifting rope.

It should be noted that operations S901 to S905 may be completed in an existing general manner.

At operation S906, in response to that the second support 14 reaches an expected height, rotating the centering regulating rod 22 of the centering component 20 to insert the centering regulating rod 22 into the guide hole 32, continuously lifting the second support 14 and rotating the centering regulating rod 22 of the centering component 20 to insert the centering regulating rod 22 into the centering slot 31, so that the first support 13 and the second support 14 are centered in the left-right direction, and simultaneously, the second antenna apparatus 12 and the second support 14 are prevented from falling off by means of the conical gasket 23.

At operation S907, rotating the lock nut 25 of the centering component 20 to move the conical gasket 23 toward the centering rotation shaft 21 and move the second support 14 toward a direction in which the second support 14 is closer to the first support 13, positioning the first support 13 and the second support 14 by means of the positioning column 416 on the first support 13 and the positioning slot 34 in the second support 14, and in response to that the conical gasket 23 cannot further move toward the first support 13, the first support 13 and the second support 14 being fixedly connected; inserting the support lock part 62 from a bottom of the first connection hole 33 of the second support 14 so as to screw the support lock part 62 into the fixing hole 415 of the first support 13, so that the connection between the first support 13 and the second support 14 is more reliable by means of the support lock part 62; and fixedly connecting the holding pole component 15 with the second support 14 through a bolt. In the process, the first support 13 and the second support 14 are positioned by means of the positioning column 416 on the first support 13 and the positioning slot 34 in the second support 14, so as to facilitate screwing the support lock part 62 into the fixing hole 415 and connecting the holding pole component 15 with the second support 14.

At operation S908, inserting the connection part 17 from a bottom of the second connection hole 35 of the second support 14, and fixedly connecting the connection part 17 with the first support 13, so that the stability of the connection between the first support 13 and the second support 14 is improved by means of the connection part 17.

According to the antenna installation device provided in the present application, in the process of connecting the first support with the second support, the first support and the second support are centered by means of the centering component including the centering rotation shaft, the centering regulating rod, and the conical gasket, the centering rotation shaft is rotatably connected with the first support; an end of the centering regulating rod is connected with the centering rotation shaft and rotates in a vertical plane with respect to the centering rotation shaft serving as a rotation axis; the conical gasket is screwed with the centering regulating rod, and can move upward in the axial direction of the centering regulating rod, the second support is provided therein with the centering slot penetrating through the second support, the inner surface of the centering slot is a conical surface, in the process of connecting the first support with the second support, the centering regulating rod is rotated to be disposed in the centering slot of the second support, so as to facilitate the first support to capture the second support, the conical gasket is fitted together with the conical surface of the centering slot so that the first support and the second support are centered in the left-right direction (observing from the front of the antenna apparatuses) of the antenna apparatuses, and the second antenna apparatus fixedly connected to the second support can be prevented from falling off, simultaneously, operations for installing the antenna apparatuses are simplified and the difficulty of installing the antenna apparatuses is reduced.

In a second aspect, the present application provides an antenna, including a first antenna apparatus and a second antenna apparatus, which are fixed on a holding pole through the antenna installation device provided in the present application, a structure of the antenna installation device is described in detail above and is not described again herein.

In some implementations, the first antenna apparatus is fixedly connected with the first support of the antenna installation device, the second antenna apparatus is fixedly connected with the second support of the antenna installation device. The first antenna apparatus may be a 4G antenna apparatus, the second antenna apparatus may be a 5G antenna apparatus, such as an active wireless processing component. The antenna installation device provided in the present application can integrate 4G antenna apparatus and the 5G antenna apparatus together, a construction cost of base stations can be reduced, and operations for installing the antenna apparatuses are simplified, and the difficulty of installing the antenna apparatuses is reduced.

The present application discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present application as set forth in the appended claims.

What is claimed is:

1. An antenna installation device, comprising: a first support connected with a first antenna apparatus, a second support connected with a second antenna apparatus, and a holding pole component fixedly connected with a holding pole, wherein the first support and the second support are fixedly connected with the holding pole component; the antenna installation device further comprises a centering component for centering the first support and the second support, and the centering component comprises a centering rotation shaft, a centering regulating rod, and a conical gasket, wherein the centering rotation shaft is rotatably connected with the first support, a fixed end of the centering regulating rod is connected with the centering rotation shaft, and rotates in a vertical plane with respect to the centering rotation shaft serving as a rotation axis, the conical gasket is sleeved on the centering regulating rod and moves on the centering regulating rod, the second support is provided therein with a centering slot penetrating through the second support, at least a part of an inner surface of the centering slot is a conical surface, and in response to that the conical surface of the centering slot and a conical surface of the conical gasket are fitted together, the first support and the second support are centered and fixedly connected.

2. The device of claim 1, wherein the centering component further comprises an anti-disengaging part arranged at a free end of the centering regulating rod, and configured to prevent the conical gasket from disengaging from the centering regulating rod.

3. The device of claim 1, comprising: two centering components including a first centering component and a second centering component, orthographic projections of a centering rotation shaft of the first centering component and a centering rotation shaft of the second centering component intersect on a same plane, the second support is provided therein with two centering slots including a first centering slot configured for disposing the first centering component therein, and a second centering slot configured for disposing the second centering component therein.

4. The device of claim 1, wherein the first support comprises an adapter configured to fix the first antenna apparatus, the centering rotation shaft is rotatably disposed on the adapter, a first fixing surface of the adapter is fixedly connected with the first antenna apparatus, and a second fixing surface of the adapter is fixedly connected with the holding pole component.

5. The device of claim 4, wherein the adapter comprises a first adapter and a second adapter, which are arranged in parallel, and two ends of the centering rotation shaft are rotatably connected with the first adapter and the second adapter, respectively, first fixing surfaces of the first adapter and the second adapter are fixedly connected with the first antenna apparatus, and second fixing surfaces of the first adapter and the second adapter are fixedly connected with the holding pole component.

6. The device of claim 1, wherein a fixing hole is provided in a surface of the first support close to the second support, the second support is provided therein with a first connection hole penetrating through the second support, a support lock part is threaded into the first connection hole of the second support and the fixing hole of the first support, so as to fixedly connect the first support with the second support.

7. The device of claim 6, wherein a positioning column is provided on the surface of the first support close to the second support, a positioning slot is provided in a surface of the second support close to the first support, and a position of the positioning slot is opposite to a position of the positioning column, so that the positioning column and the positioning slot are configured to position the first support and the second support, after the first support and the second support are fixedly connected, the positioning column is disposed in the positioning slot.

8. The device of claim 1, wherein, the second support is provided therein with a guide hole penetrating through the second support, the guide hole and the centering slot penetrate through the second support in a radial direction of the second support, the centering regulating rod is movable between the centering slot and the guide hole during rotating in the vertical plane with respect to the centering rotation shaft serving as the rotation axis.

9. The device of claim 1, wherein a first support connection hole is provided at a side of the first support opposite to the holding pole component, a holding pole connection hole is provided at a side of the holding pole component opposite to the first support, and a holding pole lock part is threaded into the holding pole connection hole and the first support connection hole, so as to fixedly connect the first support with the holding pole component, a second support connection hole is provided at a side of the second support opposite to the holding pole component, a holding pole connection hole is provided at a side of the holding pole component opposite to the second support, and a holding pole lock part is threaded into the holding pole connection hole and the second support connection hole, so as to fixedly connect the second support with the holding pole component.

10. The device of claim 9, wherein a first holding pole limiting part is provided between the first support and the holding pole component, and is configured to limit a relative position of the first support with respect to the holding pole component, a second holding pole limiting part is provided between the second support and the holding pole component, and is configured to limit a relative position of the second support with respect to the holding pole component.

11. The device of claim 10, wherein the first holding pole limiting part and the second holding pole limiting part are integrated into one piece.

12. An antenna, comprising a first antenna apparatus and a second antenna apparatus, and further comprising the antenna installation device of claim 1, the first antenna apparatus is fixedly connected with the first support of the antenna installation device;

the second antenna apparatus is fixedly connected with the second support of the antenna installation device.

13. The device of claim 2, comprising: two centering components including a first centering component and a second centering component, orthographic projections of a centering rotation shaft of the first centering component and a centering rotation shaft of the second centering component intersect on a same plane, the second support is provided therein with two centering slots including a first centering slot configured for disposing the first centering component therein, and a second centering slot configured for disposing the second centering component therein.

* * * * *